United States Patent [19]

Bähre et al.

[11] 4,332,317
[45] Jun. 1, 1982

[54] SCRAPER CHAIN CONVEYOR

[75] Inventors: Karl Bähre, Gladbeck; Werner Böer, Castrop-Rauxel; Jörg Richter, Wattenscheid; Gerald Seebacher, Recklinghausen; Hans Warnke, Herne, all of Fed. Rep. of Germany

[73] Assignee: Kloeckner-Werke AG, Duisburg, Fed. Rep. of Germany

[21] Appl. No.: 162,032

[22] Filed: Jun. 20, 1980

[30] Foreign Application Priority Data

Jul. 3, 1979 [DE] Fed. Rep. of Germany ....... 2926798

[51] Int. Cl.³ ...................... B65G 19/24; B65G 19/28
[52] U.S. Cl. ..................................... 198/734; 198/735
[58] Field of Search ............................... 198/729–735, 198/727, 719, 850, 854; 299/34, 43; 474/155, 210, 226, 232, 235, 236

[56] References Cited

U.S. PATENT DOCUMENTS

| 722,997 | 3/1903 | Mabus et al. | 198/731 |
| 2,718,962 | 9/1955 | Reed | 198/729 |
| 4,093,065 | 6/1978 | Temme | 198/735 |

FOREIGN PATENT DOCUMENTS

| H 21428 | 3/1956 | Fed. Rep. of Germany | 198/735 |
| 1122900 | 1/1962 | Fed. Rep. of Germany | 198/735 |

Primary Examiner—Robert B. Reeves
Assistant Examiner—Douglas D. Watts
Attorney, Agent, or Firm—Michael J. Striker

[57] ABSTRACT

A double-chain conveyor is assembled of trough sections defining a bottom plate provided with lateral guiding walls for scraper elements and intermediate guides extending along the entire length of the conveyor and guidingly engaging lateral edges of flat chain elements arranged parallel to the bottom plate of the trough. The flat chain elements are provided with oblong holes extending in the direction of the chain and linking vertically directed ring-shaped chain elements with a play which permits shifting movements of all chain elements in the longitudinal direction. Intermediate drives are provided between superposed bottom plates of the trough and drive a chain wheel engaging the flat chain elements both in the upper and in the lower flight of the conveying chain.

14 Claims, 9 Drawing Figures

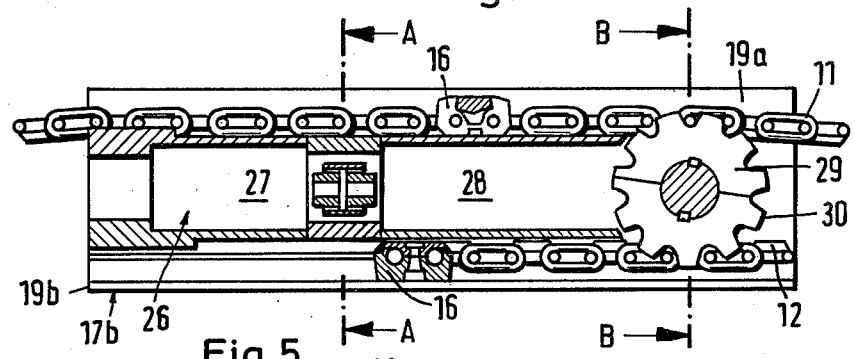
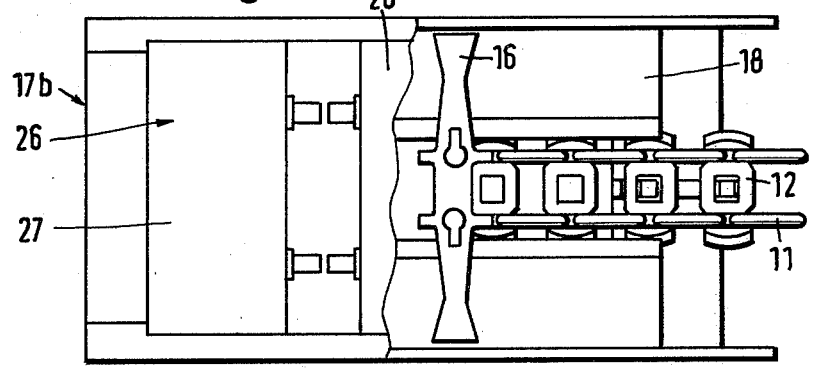
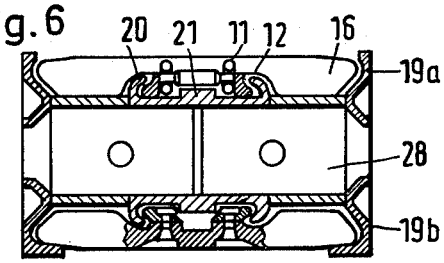
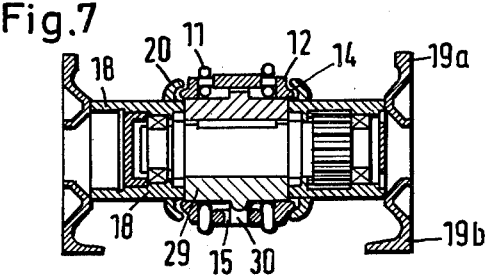

Fig. 8
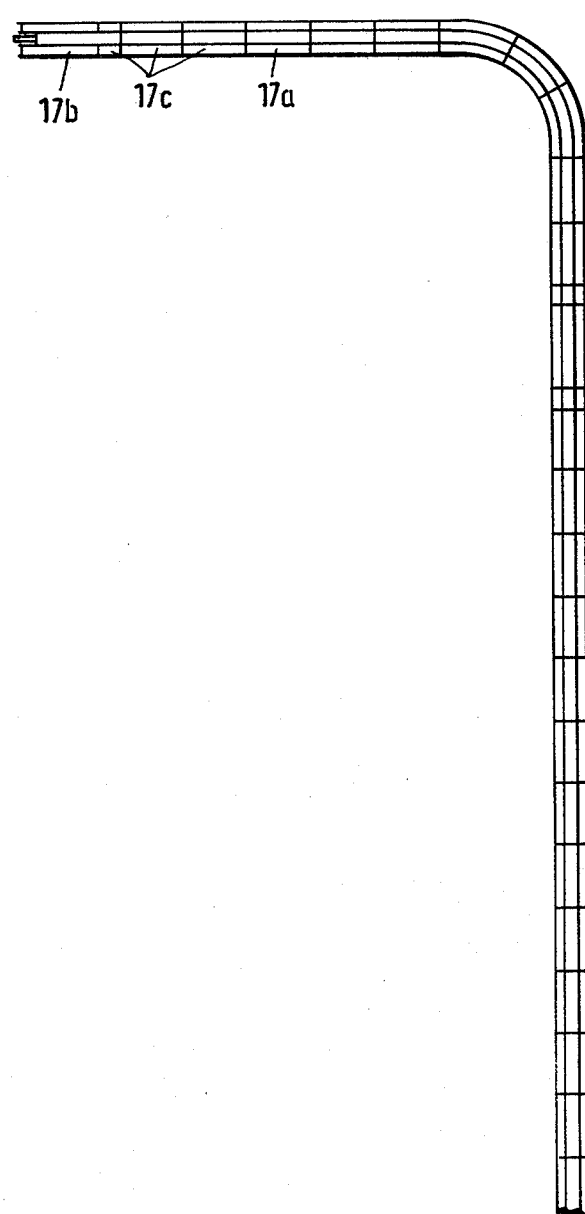
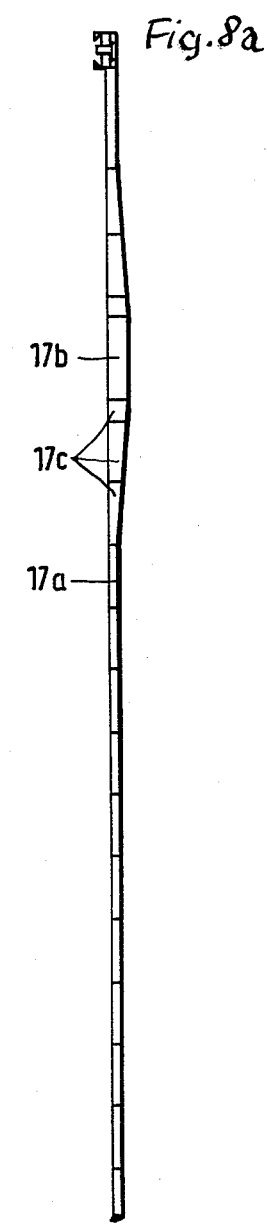
Fig. 8a

SCRAPER CHAIN CONVEYOR

BACKGROUND OF THE INVENTION

The present invention relates in general to chain conveyors and in particular to a scraper chain conveyor of the type which has an elongated trough supporting at its central part a conveying chain, particularly a double chain assembled of vertical ring-shaped and horizontal disc-shaped chain elements and including scraping members secured to the chain at a space from one another or being formed as a chain link, the scrapers extending transversely across the conveyor path and being driven together with the chain in the longitudinal direction of the trough by means of a sprocket wheel energized by driving means arranged at least at one end of the conveyor.

Conventional scraper chain conveyors of this type used for example in mining have the disadvantage that stresses acting on the chain increase more than proportionally with the increase of the conveyor length. The reason for the disproportional increase of stresses is the additional friction resulting from misalignment of respective sections of the conveyor trough which is unavoidable during the practical operation and which increases similarly as in the case of a looping friction exponentially with the sum of individual deviations. An additional disadvantage of prior art conveyors of this type is the fact that when a conveying double chain is employed, it can be operated along a curve only to a very limited degree or not at all and additional devices are necessary to extend the conveyor along a curve.

Moreover the known scraper chain conveyors have the disadvantage that an excessive prestressing of the conveying chain is necessary in order to insure a disturbance free operation. The prestressing here is especially required for the conveyor having conveying chains arranged at their central plane inasmuch as apart from controlling the suspended chain at the terminal drives it is also necessary to prestress the chain for adjusting the position of the scraping iron pieces (side attachments) above their vertical central axes.

SUMMARY OF THE INVENTION

It is therefore a general object of the present invention to overcome the aforementioned disadvantages.

More particularly, it is an object of the present invention to provide an improved scraper chain conveyor of the above-described type in which the chain stresses which normally increase disproportionally to the length of the conveyor are substantially reduced.

In keeping with these objects, and others which will become apparent hereafter, one feature of the invention resides in linking individual chain elements with a play sufficient to permit transverse sliding motion of the chain element, in shaping the scraper pieces which are positively coupled to linking elements arranged perpendicularly to the bottom of the conveyor trough in such a manner that the scraper encloses with a plane the contour of a joining link elements which are coplanar with the bottom of the trough and thus avoiding angular displacement of the scraper above predetermined limits, and at least one intermediate drive is provided in addition to the end drive.

By virtue of the aforementioned novel features, the stresses acting on the chain are reduced at least by the quotient of the number of the employed intermediate drives. The central conveying chain now operates without any prestressing and by contrast, the links of the chain have the freedom to perform a shifting motion relative to each other whereas the positive locking of the scraping elements against angular displacement contributes to the security against derailment.

The chain strand is formed by a combination of ring-shaped links arranged substantially perpendicularly to the bottom plane of the conveyor trough and disc-shaped chain elements arranged substantially parallel to the bottom plate and being provided with openings engageable with sprockets of a driving gear. In this arrangement, the spacing of engagement points is about half of that required in conventional conveying chains employing ring-shaped chain elements of a comparable size. As a result, the arrangement of this invention makes it possible to employ a sprocket or chain wheel having an adequate number of engaging teeth or sprockets both in the upper flight and in the lower flight of the chain.

In order to obtain the required shift ability of the chain elements relative to each other, the vertical ring-shaped elements are coupled to the horizontal disc-shaped chain elements with a longitudinal play of about 15% of the spacing of the teeth of the sprocket wheel. In this manner the limits of angular displacement or rotation of respective disc-chain elements about their axes which are perpendicular to the bottom plate of the trough is adjusted such that the chain elements are shiftable relative to each other both in the longitudinal direction of the trough and in the transverse direction and consequently, the conveyor is capable of being extended along a curved track and rerouted about a deviating route.

Each scraper which is secured to two juxtaposed vertical or ring-shaped chain elements can also be shaped as to replace the two vertical chain elements and to act as a chain locking member. As mentioned above, the scraper is shaped to a form which embraces with a certain play the adjoining horizontal or disc-shaped chain elements. Play formed at the angular displacement about the axis perpendicular to the bottom plate of the trough is limited while the scrapers are permitted to be tilted in the direction of travel of the chain so as to allow the reversal of the direction of travel of the chain at the end deviation wheels or in the range of an intermediate deviation of the conveyor trough.

According to another feature of this invention, the coupling elements for connecting respective trough sections of the conveyor are arranged at the central plane of the conveyor so that the length of the conveyor always remains the same and the zero prestressing of the chain is maintained. The coupling parts have a longitudinal play with respect to the coupling points on respective trough sections which is necessary for the assembly of the latter or for establishing the reverse loop but preferably the coupling parts are without any longitudinal play.

Whereas in the known scraper chain conveyors the guide of the conveying chain in the direction perpendicular to the bottom plate of the trough is taken over by the guides formed in the profiled lateral walls of the trough for guiding the scraper elements, in the preferred embodiment of this invention the horizontal disc-shaped chain elements are guided by separate guides at least in the range of the intermediate conveyor drives where the vertical guidance and the shiftability of individual chain elements is of particular importance. It is preferred, however, to guide the disc-shaped horizontal chain elements over the entire length of the conveyor. These intermediate guides for the horizontal chain elements take over also the horizontal guidance of the entire conveyor chain. Due to the enclosing shape of the scraper elements with respect to the adjoining horizontal disc-shaped chain elements, rotation of the scraper elements in the plane parallel to the bottom plate of the trough is limited and consequently the scraper elements travel substantially in alignment with each other due to the interaction of this closing shape and of the central guide for the horizontal chain elements. At the same time, the central guides of the conveyor due to their mutual shiftability of respective chain elements insure that the transfer of thrust takes place without any self-locking action. In prior art conveyors of this type the adjustment of the suspended flight of the chain takes place by changing the spacing between the chain drives whereby a prestressing force has to be applied. In the scraper chain conveyor of this invention the adjustment of the suspended chain portions is affected by the mutual shiftability of respective chain elements which affects the length of the suspended chain run whereby no prestress of this run is necessary. For this purpose even in the prior art chain conveyors there are also provided two coupling points formed on the profiled side walls of respective trough sections whereby the longitudinal tolerance or play between two trough sections corresponds to the necessary angular adjustability thereof.

The capability of the conveyor of this invention to be curved is applicable to any angle provided that a sufficient sliding curve is formed by the trough sections whereby the traction of the chain before the curve is exhausted and the scraper iron pieces are positively guided in the lateral guides.

In the conveyor of this invention, there is no need for a provision of a foundation surface for respective drives and curves. In practice, the conveyor of this invention is equipped for example with five drives whereby in the range of the intermediate drive the trough is raised above ground by about 220 mm which amount is very low in comparison to conventional conveyors.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 4 is a sectional side view of an intermediate driving means of the scraper chain conveyor of this invention;

FIG. 5 is a partly cut-away top view of the conveyor part of FIG. 4;

FIG. 6 is a front cross-sectional of the conveyor part of FIG. 4, taken along the line A—A;

FIG. 7 is a similar view as FIG. 6 taken along the line B—B in FIG. 4;

FIG. 8 is a top view of the scraper chain conveyor of this invention extended along a path and including a plurality of intermediate drives; and FIG. 8a is a side view of the conveyor of FIG. 8.

DESCRIPTION OF THE PREFERRED EMBODIMENTS

Figure 1:
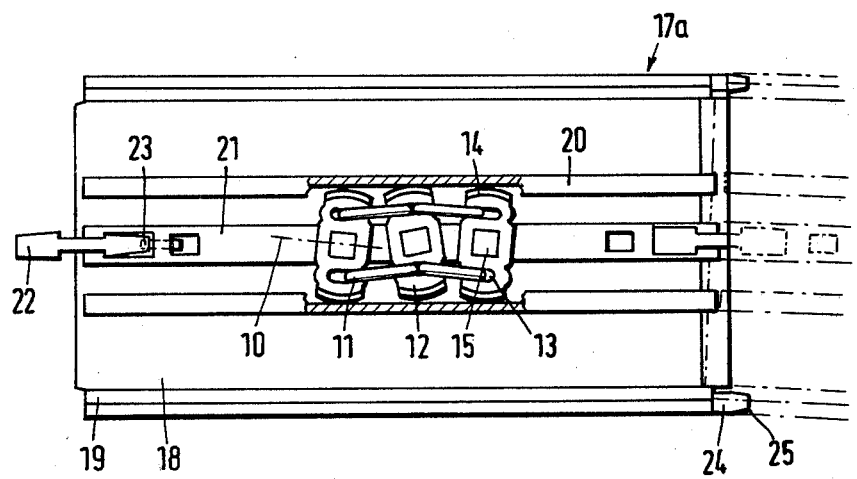
FIG. 1 is a top view of a trough section of the scraper chain conveyor of this invention.
Figure 2:
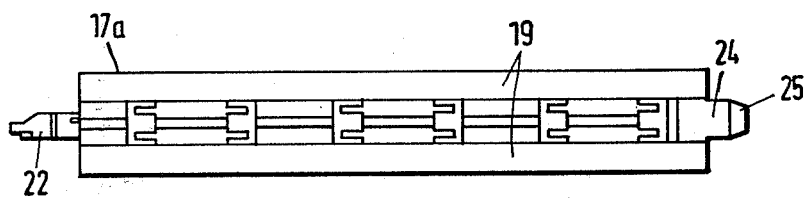
FIG. 2 is a side view of the trough section of FIG. 1.

The exemplary embodiment of the scraper chain conveyor of this invention as illustrated in the drawings includes a central double chain 10 which is assembled of vertically directed ring chain elements 11 and of horizontally directed chain elements 12 in the form of flat plates. The first chain elements 12 in the range of the ring-shaped elements 11 are provided with oblong holes 13 extending in the direction of travel of the chain 10 and in the central range are provided with square holes 15 for engaging sprockets of driving chain wheels as it will be explained below. Each of the two oblong holes 13 in respective chain elements 12 accommodates two ring-shaped chain elements 11. The length of the hole 13 is preferably adjusted such that the resulting play between the two ring-shaped chain elements 11 in longitudinal direction amounts approximately to 15% of the chain pitch. As a result, the chain elements become shiftable relative to each other both in the longitudinal and in the transverse direction without any self-locking effect whereby the horizontally directed strip-like chain elements 12 act as driven links engaging the teeth of the wheel of a power drive.

The flat chain elements 12 which are arranged in parallel to the bottom 18 of the trough 17 have lateral edges 14 which are reduced in thickness and have a convex shape. These lateral edges 14 slidably engage central guides 20 of the conveyor trough 17 and the rounded or convex configuration of these edges permits a limited angular movement of the chain links within these guides 20.

The conveying chain 10 supports at regular intervals, for example each fifth chain link, scraper elements 16 which extend transversely over the trough 17 and are secured to an opposite pair of vertically directed ring-shaped chain elements 11. Within the range of the inner guides 20, scrapers 16 are shaped so as to embrace with a certain play the contour of the adjoining flat chain elements 12 and in this manner the scrapers 16 are secured against angular displacement above the limits determined by this play. The play or tolerance of this enclosing shape is selected such as to permit the deviation of the trough sections from a straight path. The enclosing shape of scraper elements 16 permits however the rotation of the scraper about its longitudinal axis so as to adjust its angular position during the travel of the chain about a raised portion of the conveyor trough in the region of intermediate drives or during the reversal of the chain travel at the end deviating wheels. Instead of securing the scraper elements 16 to the opposite ring-shaped chain elements, it is also possible to replace the supporting vertical chain elements by a corresponding shape of the body of the scraper 16 itself (FIG. 4) so that the scraper is linked to the two adjoining horizontal chain elements and acts as a chain lock.

Figure 3:
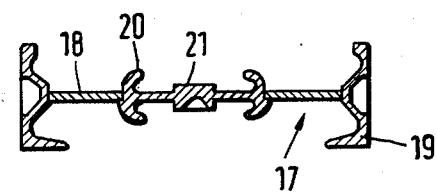
FIG. 3 is a sectional front view of the trough section of FIG. 1.

Referring to FIG. 3, the conveyor trough 17 includes a trough bottom plate 18 extending between central parts of two profiled side walls 19. The central region of the bottom plate 18 is provided with a central guiding rib 21 and with two T-shaped guides 20 extending along the entire length of the trough 17. The bottom edges of the intermediate guide 20 engage the edges 14 of the horizontal chain links 12 and in this manner the chain 10 is directly guided along its entire length. As a consequence, it is no longer necessary to provide corresponding C-shaped profiles on the inner surfaces of the lateral or side walls 19. The central guiding rib 21 has a substantially rectangular cross-section which occupies almost the entire space between the opposite ring-shaped chain links 11 and between the lower surface of the flat chain links 11 and the corresponding surface of the bottom plate 18. Preferably the central guiding rib 21, the intermediate guides 20 and the bottom plate 18 are integrally formed as one-piece.

A plurality of trough sections 17a are interconnected along their leading and trailing edges by means of a central coupling member 22 which is secured to the corresponding trough section 17a by means of a coupling pin 23 so that a negligible play in longitudinal direction will result whereby a certain tolerance, for example about 3° is established to permit the mutual angular displacement of the trough sections in the plane of the bottom plate. To establish this deviation tolerance, the central coupling member 22 has a slightly tapering configuration and also the side walls 19 of each trough section are at there trailing edges provided with lateral coupling projections 24 having tapering end portions 25 and the leading edge of the trough section has a corresponding tapering recessed portion so as to permit the aforementioned limited angular deviation from a straight direction of the interconnected trough sections 17a.

Referring now to FIGS. 4 through 8a, one or more intermediate drives 26 are arranged between two superposed trough sections 17b. Each intermediate drive 26 includes a driving motor 27 and a transmission gear unit 28 which drives a chain or sprocket wheel 29. The sprocket wheel is in engagement both with the upper flight and with the lower flight of the chain 10.

The intermediate drive 26 is arranged between the upper and lower flights of the conveyor chain 10 between the two bottom plates 18 of the superposed trough sections 17a 17b, each having a pair of intermediate guides 20 and a central guiding plate 21. The upper lateral guides 19a in the side walls 19 are raised relative to the lower lateral guide 19b about a distance sufficient for accommodating the intermediate drive. As illustrated in FIG. 6, the shaft 28 of the driving chain wheel 29 is supported for rotation in the side walls 19 between the superposed bottom plates 18 and as illustrated in FIGS. 4 and 7, the sprockets or teeths 30 of the chain wheel 29 engage the central openings 15 in the flat chain links 12 so that the latter transmit the thrust to the hole chain 10.

Due to the combination of the vertically arranged ring-shaped chain links 11 with the horizontally arranged flat chain links 12 which act as driving links of the chain, the chain pitch for engaging the chain wheel 29 can be about one half of that which is normally necessary when ring-shaped driving links are employed. Consequently, the height of the superposed conveyor trough sections 17a and 17b in the range of the intermediate drive 26 is very low relative to conventional conveyors from this type while sufficient number of teeth or sprockets in the chain wheel 26 is always in engagement with the chain.

As illustrated in FIG. 8a, there are also employed inclined transition trough sections 17c which gradually connect the superposed trough sections 17a and 17b in the range of the intermediate drive with the single trough sections 17a in the remaining parts of the conveyor.

It will be understood that each of the elements described above, or two or more together, may also find a useful application in other types of constructions differing from the types described above.

While the invention has been illustrated and described as embodied in a scraper chain conveyor having a central double chain, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A scraper chain conveyor comprising a supporting trough defining a bottom plate, side walls and intermediate guides provided on said bottom plate, a conveying chain assembled of ring-shaped chain elements arranged substantially perpendicularly to the bottom plate, flat chain elements arranged substantially parallel to said bottom plate, and of scraping elements, said flat chain elements being guided between said intermediate guides and being linked to said ring-shaped elements with a play sufficient to permit sliding motion of respective chain elements in the longitudinal direction of the chain, said scraping elements being shaped to enclose with a predetermined play the contour of the adjoining flat chain elements, and at least one driving unit arranged between said side walls of said trough and including a chain wheel drivingly engaging said flat chain elements, said conveyor chain being a double chain having two parallel sets of said ring-shaped chain elements connected by said flat chain elements with a play sufficient to permit said longitudinal sliding motion without any self-locking effect, said flat chain elements being provided in the range of said ring-shaped chain elements with oblong holes for accommodating the latter and with a central hole for engaging said chain wheel.

2. A conveyor as defined in claim 17, wherein said trough in the region of said driving unit includes two superposed bottom plates adjoining said driving unit, and said chain passing around the outer surfaces of said bottom plates.

3. A conveyor as defined in claim 2, wherein said intermediate guides of said trough extend along the entire length of said chain.

4. A conveyor as defined in claim 3, wherein said intermediate guides have respectively inwardly bent guiding edges engaging the lateral edges of said flat chain elements to directly guide both the upper flight and the lower flight of the chain.

5. A conveyor as defined in claim 4, wherein the teeth of the chain wheel engage said flat chain elements both in the upper flight and in the lower flight of the conveying chain.

6. A conveyor as defined in claim 5, wherein the longitudinal dimension of said oblong holes is such as to permit a play in longitudinal direction amounting approximately to 15% of the chain pitch.

7. A conveyor as defined in claim 6, wherein the lateral edges of said flat chain elements are reduced in thickness to engage the inwardly bent guiding edges of said intermediate guides.

8. A conveyor as defined in claim 7, wherein said lateral edges have a convex shape to permit angular displacement of said flat chain elements within predetermined limits.

9. A conveyor as defined in claim 8, wherein said convex lateral edges of said flat chain elements have a rounded cross-section.

10. A conveyor as defined in claim 1, wherein the upper and lower surfaces of said bottom plate are provided with a central guiding rib extending between said intermediate guides along the entire length of said chain.

11. A conveyor as defined in claim 10, wherein said central guiding rib occupies the space between the bottom plate and said flat chain elements.

12. A conveyor as defined in claim 1, wherein said supporting trough is assembled of a plurality of trough sections coupled in the central region by coupling members without any play in longitudinal direction.

13. A conveyor as defined in claim 12, wherein said coupling members are tapered to permit the deviation of respective coupling sections.

14. A conveyor as defined in claim 11, wherein said side walls engage with a predetermined play the lateral edges of said scraper elements.

* * * * *